US010474296B1

(12) United States Patent
Chen

(10) Patent No.: US 10,474,296 B1
(45) Date of Patent: Nov. 12, 2019

(54) LASER SCANNING DEVICES AND METHODS WITH TOUCH DETECTION

(71) Applicant: Microvision, Inc., Redmond, WA (US)

(72) Inventor: Chao Chen, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 20 days.

(21) Appl. No.: 16/033,486

(22) Filed: Jul. 12, 2018

(51) Int. Cl.
| | | |
|---|---|---|
| *G06F 3/042* | (2006.01) | |
| *G09G 3/02* | (2006.01) | |
| *G02B 26/10* | (2006.01) | |
| *G01S 17/42* | (2006.01) | |
| *G01S 17/10* | (2006.01) | |
| *G06F 1/16* | (2006.01) | |
| *H04N 9/31* | (2006.01) | |
| *H04N 3/08* | (2006.01) | |
| *G09G 3/34* | (2006.01) | |

(52) U.S. Cl.
CPC ......... *G06F 3/0421* (2013.01); *G02B 26/105* (2013.01); *G09G 3/025* (2013.01); *G01S 17/10* (2013.01); *G01S 17/42* (2013.01); *G06F 1/1639* (2013.01); *G06F 1/1673* (2013.01); *G09G 3/346* (2013.01); *H04N 3/08* (2013.01); *H04N 9/3129* (2013.01); *H04N 9/3135* (2013.01); *H04N 9/3155* (2013.01); *H04N 9/3161* (2013.01); *H04N 9/3164* (2013.01)

(58) Field of Classification Search
CPC ...... G01S 7/4861; G01S 7/4863; G01S 17/00; G01S 17/10; G01S 17/42; G01S 17/48; G01S 7/4865; G01S 7/51; G02B 26/0841; G02B 26/085; G02B 26/0858; G02B 26/105; G06F 1/1639; G06F 1/1673; G06F 1/1686; G09G 3/02; G09G 3/025; G09G 3/346; G09G 2320/0633; G09G 2320/064; H04N 9/3129; H04N 9/3161; H04N 9/3135; H04N 9/3155; H04N 9/3164; H04N 13/388; H04N 3/08; H04N 9/14; G06T 17/00; G06T 2207/10028; G06T 7/521

See application file for complete search history.

(56) References Cited

U.S. PATENT DOCUMENTS

| | | | | |
|---|---|---|---|---|
| 6,807,010 | B2* | 10/2004 | Kowarz | H04N 9/3105 |
| | | | | 348/E9.026 |
| 7,473,888 | B2* | 1/2009 | Wine | G02B 26/0841 |
| | | | | 250/208.1 |
| 9,921,056 | B2* | 3/2018 | Honkanen | G01B 11/2518 |
| 2004/0056824 | A1* | 3/2004 | Sudo | G02B 27/2264 |
| | | | | 345/7 |

(Continued)

*Primary Examiner* — Michael J Eurice
(74) *Attorney, Agent, or Firm* — Kevin D. Wills

(57) ABSTRACT

Laser scanning devices and methods are described that provide for improved touch detection. The laser scanning devices and methods determine if an object is touching a touch surface by determining if a halo region having corresponding locally high amplitude signals is proximate to the object. The presence of such a halo region can confirm that the object is touching surface and not just hovering above the surface. Furthermore, the presence of the halo region can confirm object touching even for objects having significantly different sizes. As one example, the determined presence of the halo region can be used to reliably determine that a human finger is touching the surface even though human fingers can have significantly different sizes.

20 Claims, 10 Drawing Sheets

(56) References Cited

U.S. PATENT DOCUMENTS

| | | | |
|---|---|---|---|
| 2005/0035943 A1* | 2/2005 | Kojima | H04N 9/3129 345/156 |
| 2006/0244925 A1* | 11/2006 | Seki | G03B 21/2086 353/52 |
| 2007/0252918 A1* | 11/2007 | Furuya | G02B 27/48 348/742 |
| 2009/0279163 A1* | 11/2009 | Kurozuka | G02B 26/0841 359/291 |
| 2009/0316243 A1* | 12/2009 | Tsuida | B41J 2/471 359/202.1 |
| 2010/0073580 A1* | 3/2010 | Ritz | G03B 21/26 348/745 |
| 2010/0149073 A1* | 6/2010 | Chaum | G02B 27/0093 345/8 |
| 2010/0195180 A1* | 8/2010 | Akanuma | G02B 26/0858 359/200.8 |
| 2010/0309536 A1* | 12/2010 | Akanuma | G02B 26/0858 359/200.8 |
| 2011/0149380 A1* | 6/2011 | Xue | G02B 26/101 359/318 |
| 2012/0035934 A1* | 2/2012 | Cunningham | G06F 1/1639 704/260 |
| 2013/0050156 A1* | 2/2013 | Rothaar | G02B 26/101 345/204 |
| 2013/0107000 A1* | 5/2013 | Xue | G01S 17/023 348/46 |
| 2013/0176351 A1* | 7/2013 | Abele | G09G 3/3406 345/690 |
| 2013/0201459 A1* | 8/2013 | Seo | G03B 21/147 353/98 |
| 2013/0207950 A1* | 8/2013 | Haruna | H04N 9/3135 345/207 |
| 2014/0104501 A1* | 4/2014 | Jackson | G09G 5/10 348/744 |
| 2014/0204966 A1* | 7/2014 | Tsai | H04N 9/3135 372/24 |
| 2014/0240808 A1* | 8/2014 | Yamamoto | G02B 26/101 359/198.1 |
| 2014/0253527 A1* | 9/2014 | Ogi | G09G 5/02 345/207 |
| 2014/0327835 A1* | 11/2014 | Woltman | H04N 9/3135 348/759 |
| 2015/0116672 A1* | 4/2015 | Woltman | G03B 21/2086 353/85 |
| 2016/0255316 A1* | 9/2016 | Kobori | G02B 26/101 348/746 |
| 2016/0274365 A1* | 9/2016 | Bailey | G02B 27/0093 |
| 2017/0068393 A1* | 3/2017 | Viswanathan | G06F 3/0416 |
| 2017/0118452 A1* | 4/2017 | Ogi | G02B 26/0833 |
| 2017/0176575 A1* | 6/2017 | Smits | G01S 17/003 |
| 2017/0176596 A1* | 6/2017 | Shpunt | G01S 17/89 |
| 2017/0180690 A1* | 6/2017 | Jackson | H04N 9/14 |
| 2018/0035087 A1* | 2/2018 | Xu | H01S 5/06825 |
| 2018/0045509 A1* | 2/2018 | Honkanen | G01B 11/2518 |
| 2019/0257921 A1* | 8/2019 | Smits | G01S 7/4808 |

* cited by examiner

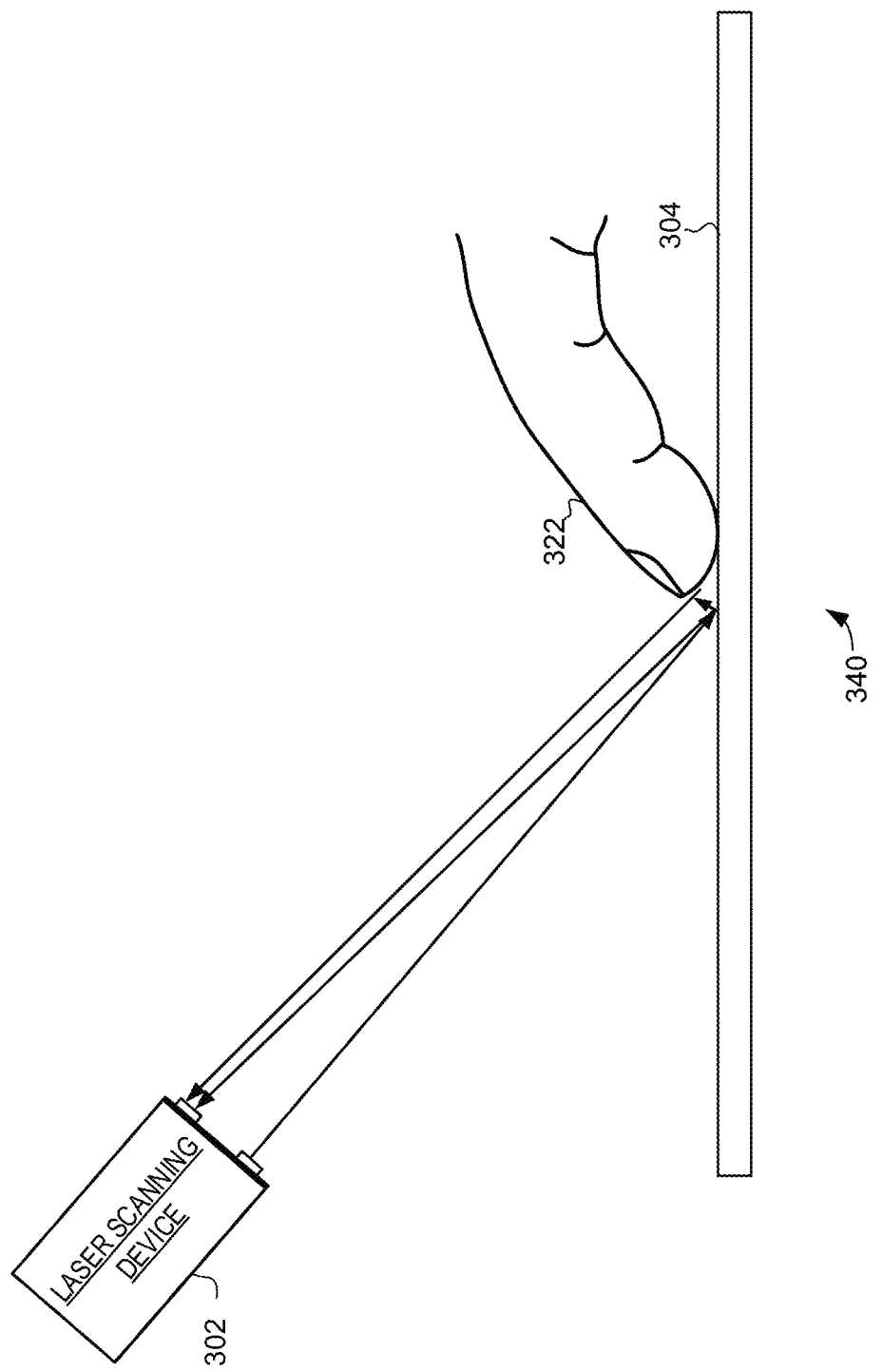

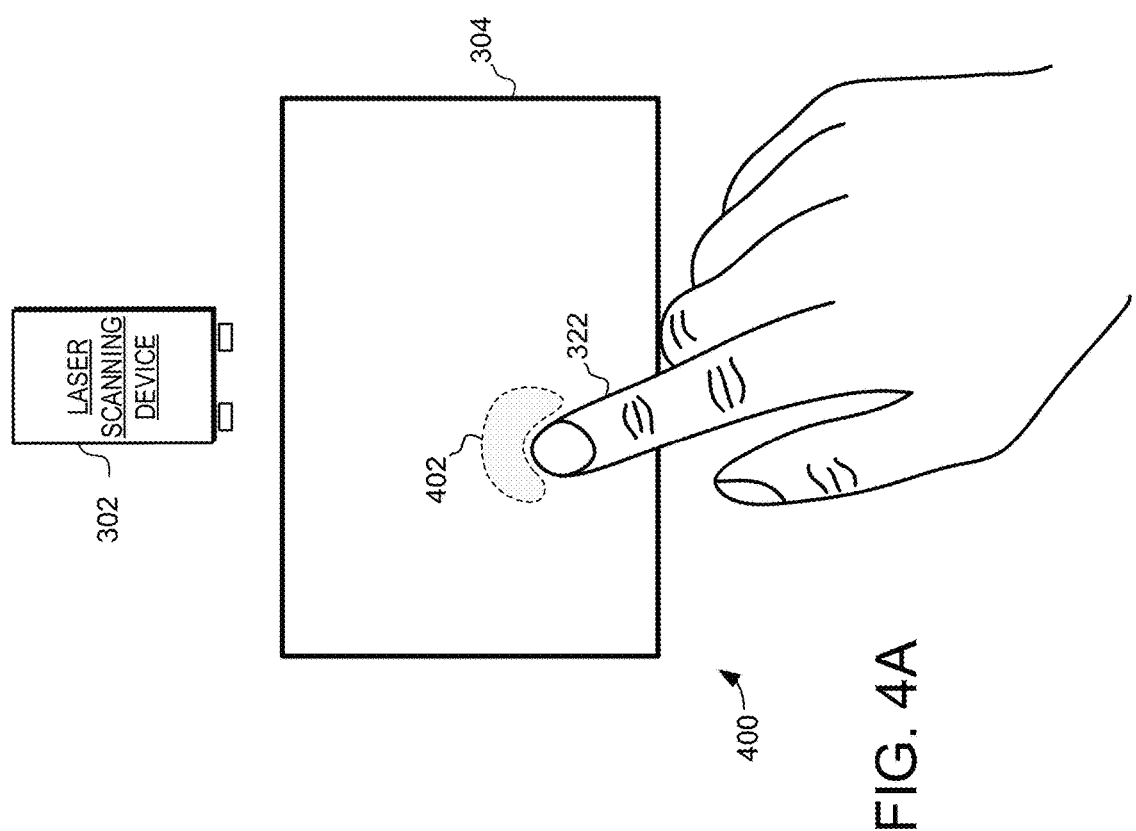

FIG. 5B

| 6 | 5 | 7 | 5 | 6 | 6 | 7 | 9 | 10 | 11 |
|---|---|---|---|---|---|---|---|---|---|
| 4 | 5 | 5 | 4 | 5 | 11 | 9 | 11 | 12 | 11 |
| 4 | 5 | 7 | 6 | 10 | 10 | 15 | 22 | 15 | 12 |
| 4 | 4 | 9 | 7 | 15 | 19 | 24 | 21 | 7 | 3 |
| 5 | 6 | 4 | 10 | 20 | 28 | 12 | 16 | 19 | 18 |
| 3 | 5 | 5 | 9 | 24 | 33 | 22 | 28 | 46 | 41 |
| 4 | 4 | 6 | 11 | 17 | 31 | 16 | 13 | 14 | 17 |
| 5 | 4 | 4 | 6 | 11 | 15 | 22 | 12 | 2 | 1 |
| 5 | 5 | 4 | 4 | 6 | 11 | 9 | 11 | 13 | 10 |
| 5 | 3 | 6 | 6 | 5 | 6 | 7 | 7 | 7 | 8 |
| 4 | 4 | 4 | 8 | 4 | 6 | 6 | 7 | 6 | 7 |

| 0 | 0 | 1 | 2 | 1 | 1 | 1 | 0 | 1 | 1 |
|---|---|---|---|---|---|---|---|---|---|
| 1 | 0 | 1 | 1 | 0 | 0 | 2 | 0 | 0 | 1 |
| 0 | 2 | 1 | 0 | 0 | 1 | 0 | 3 | 0 | -1 |
| 1 | 0 | 0 | 1 | 2 | 0 | 0 | 0 | -2 | 0 |
| 1 | 2 | 0 | 2 | 0 | 0 | 0 | 1 | 2 | 2 |
| 1 | 0 | 0 | 0 | 0 | -1 | 2 | 0 | 0 | 0 |
| 1 | 1 | 1 | 0 | 0 | 0 | 0 | 0 | 0 | 0 |
| 0 | 0 | 0 | -1 | 1 | 0 | 0 | 0 | 2 | -1 |
| 2 | 0 | 1 | 1 | 2 | 0 | -1 | 1 | 0 | 1 |
| 1 | 0 | -1 | 0 | 1 | 0 | 1 | 0 | -1 | 1 |
| 1 | 0 | 2 | 1 | 2 | 0 | 1 | 2 | 1 | 0 |

502

LASER SCANNING DEVICES AND METHODS WITH TOUCH DETECTION

FIELD

The present disclosure generally relates to laser scanning, and more particularly relates to touch detection with laser scanning devices.

BACKGROUND

A variety of different types of input devices are used in electronic devices and systems. For examples, a variety of object sensing devices, including touchpads and touchscreens have been used as input devices computers, mobile devices, gaming devices, etc. In such devices a variety of technics can be used to determine the presence and/or location of one or more input objects proximate to the touch surface. These determined object presences and locations can then be used to generate a variety of user interface inputs and controls.

One continuing issue with such input devices is touch detection. Specifically, it is desirable in many applications to accurately determine when an input object has physically touched a surface. For example, it may be desirable to reliably determine that a finger has touched the touch surface be before an input is confirmed. Unfortunately, in many devices it can be difficult to distinguish between an input object that is touching the surface and one that is merely hovering closely to the surface. For example, in some input devices the resolution may be insufficient to distinguish between an object that is touching and one that is merely hovering. This can be especially problematic when the input object is a human finger that can have significant variation in size and shape.

In such input devices a hovering object may be incorrectly determined to be touching and an unwanted or inadvertent input generated as a result. In other cases a touch of the surface can be missed and no input generated when such an input was desired by the user. In either case the incorrect determination of a touch of the surface can lead poor usability and annoyance by the user.

Therefore, what is needed are improved devices and methods for reliably determining when an input object has touched a touch surface in an input device.

BRIEF DESCRIPTION OF THE DRAWINGS

FIGS. 3A, 3B, and 3C are schematic diagrams of laser scanning device in accordance with various embodiments of the present invention;

FIGS. 4A and 4B are schematic top views of a laser scanning device in accordance with other various embodiments of the present invention;

FIGS. 5A and 5B are tables showing exemplary amplitude signals in accordance with various embodiments of the present invention.

DESCRIPTION OF EMBODIMENTS

The embodiments described herein provide laser scanning devices and methods with improved touch detection. The laser scanning devices and methods utilize a scanning laser to determine if an input object (e.g., a finger) is touching a surface. Specifically, the laser scanning devices and methods determine if an object is touching by determining if a halo region having corresponding locally high amplitude signals is proximate to the object. The presence of such a halo region can confirm that the object is touching surface and not just hovering above the surface. Furthermore, the presence of the halo region can confirm object touching even for objects having significantly different sizes. As one example, the determined presence of the halo region can be used to reliably determine that a human finger is touching the surface even though human fingers can have significantly different sizes.

The embodiments described herein can be implemented in a wide variety of different types of laser scanning devices. For example, the embodiments can be implemented in sensing devices implemented to detect perform depth sensing and 3D mapping to locate objects. In other embodiments depth sensing and object detection can be combined with image projection. These devices, commonly referred to as scanning laser projectors can both project images that can include one or more virtual user interface elements (e.g., buttons, sliders, etc.) and can use the depth mapping, object detection, and touch detection to determine when a user is touching those virtual user interface elements. In such embodiments the touch detection device can provide confirmation that a user is touching the surface and thus intends to activate the associated user interface element.

Figure 1:
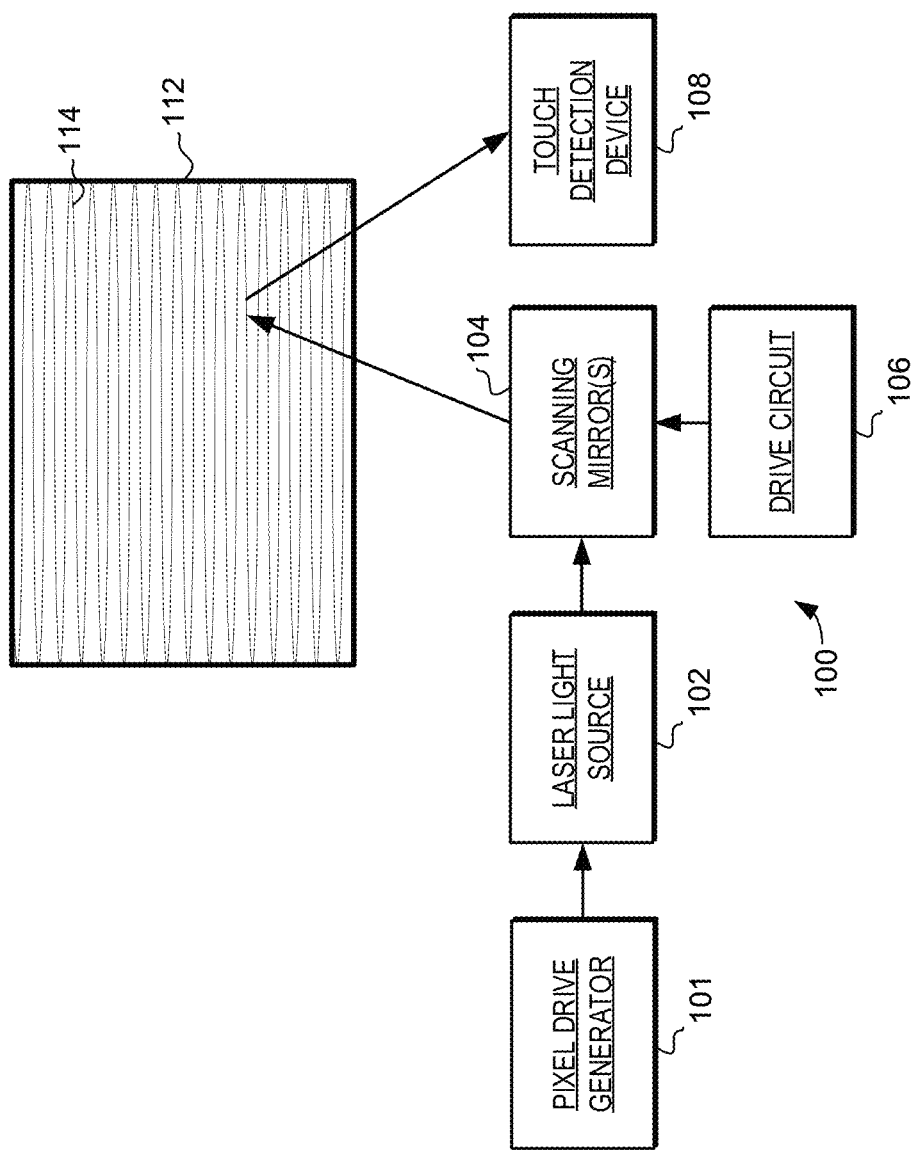
FIG. 1 shows a schematic diagram of a laser scanning device in accordance with various embodiments of the present invention.

Turning now to FIG. 1, a schematic diagram of a laser scanning device 100 is illustrated. The laser scanning device 100 includes a laser light source 102, scanning mirror(s) 104, a drive circuit 106, and a touch detection device 108. During operation, the laser light source 102 generates a beam of laser light that is reflected by the scanning mirror(s) 104 into a pattern 114 of scan lines inside a scanning region 112 on a touch surface. As one example, the laser light source 102 can comprise an infrared laser. In other embodiments the laser light source can comprise an infrared laser and one or more visible light lasers to provide both detection and image projection.

In the example of FIG. 1, the pattern 114 of scan lines comprises a raster pattern. However, this is just one example, and in other embodiments other patterns of scan lines can be generated as used. For example, spiral patterns and Lissajous patterns could instead be used. To facilitate the generation of the pattern 114, the drive circuit 106 controls the movement of the scanning mirror(s) 104. Specifically, the drive circuit 106 provides excitation signal(s) to excite motion of the scanning mirror(s) 104 in a way that results in the generation of the pattern 114 of scan lines.

In accordance with the embodiments described herein, the touch detection device 108 is configured to confirm that an object has touched the touch surface. Specifically, the touch detection device 108 is configured to receive reflections of the laser beam and determine if an object is touching the surface by determining if a halo region having corresponding locally high amplitude signals is proximate to the object. In general, the amplitude signals are signals generated by the touch detection device 108 in response to the received reflections. In a typical embodiment these amplitude signals are at least partially proportional to the intensity or power of the received reflections. Thus, in these embodiments the areas of the pattern 114 that reflect more of the laser beam back to the optical sensor will have larger corresponding amplitude signals and areas of the pattern 114 that reflect less of the laser beam back to the optical sensor will have smaller corresponding amplitude signals.

The presence of such a halo region proximate to the object confirms that the object is touching the surface and not just hovering above the surface. Furthermore, this technique can confirm touching in objects having significantly different sizes. For example, techniques can be used to reliably determine that a human finger is touching the surface even though human fingers can have significantly different sizes.

A variety of technics can be used to determine when a halo region having corresponding locally high amplitude signals is proximate to the object. For example, the amplitude signals can be generated and compared to one or more threshold values to determine if the amplitude signals are in a threshold range that corresponds to likely halo regions. In other examples the size and shape of the halo region can be compared to the object. For example, the size and shape of a possible halo region can be compared to the size and shape of a typical human finger. Again, this provides the ability to confirm the presence of the halo region in the amplitude values and can thus be used to confirm that the object has touched the touch surface. As another example, the amplitude signals over time can be analyzed to determine if the halo region appeared in time with the presence of the located object.

As one example implementation, the touch detection device 108 can be configured to confirm touches in a scanning laser projector that is used to provide a device user interface. In such an implementation, the scanning laser projector would project images on the scanning region 112 using the laser light source 102, the scanning mirror(s) 104, and the drive circuit 106. These projected images can provide visual elements representing buttons and other user interface elements. Additionally, the laser light source 102 would generate detection pulses that are also projected over the scanning region. The touch detection device 108 will receive reflections of the detection pulses and use those reflections to determine when objects are touching the various user interface elements.

In one embodiment, the touch detection device 108 is configured to receive reflections of the laser beam detection pulses from the touch surface and generate timing data from the received reflections. This timing data can then be used to generate a 3-dimensional point cloud of the touch surface and any objects in the scanning region 112 based at least in part on the timing data and the second timing data. For example, the touch detection device 108 can be configured to calculate a time of flight for the return of each received pulse. The generated times of flight for the received pulses are used to generate the 3-dimensional point cloud of the surface and any objects. This 3-dimensional point cloud of the surface can then be used to locate any objects in the scanning region.

Figure 2:
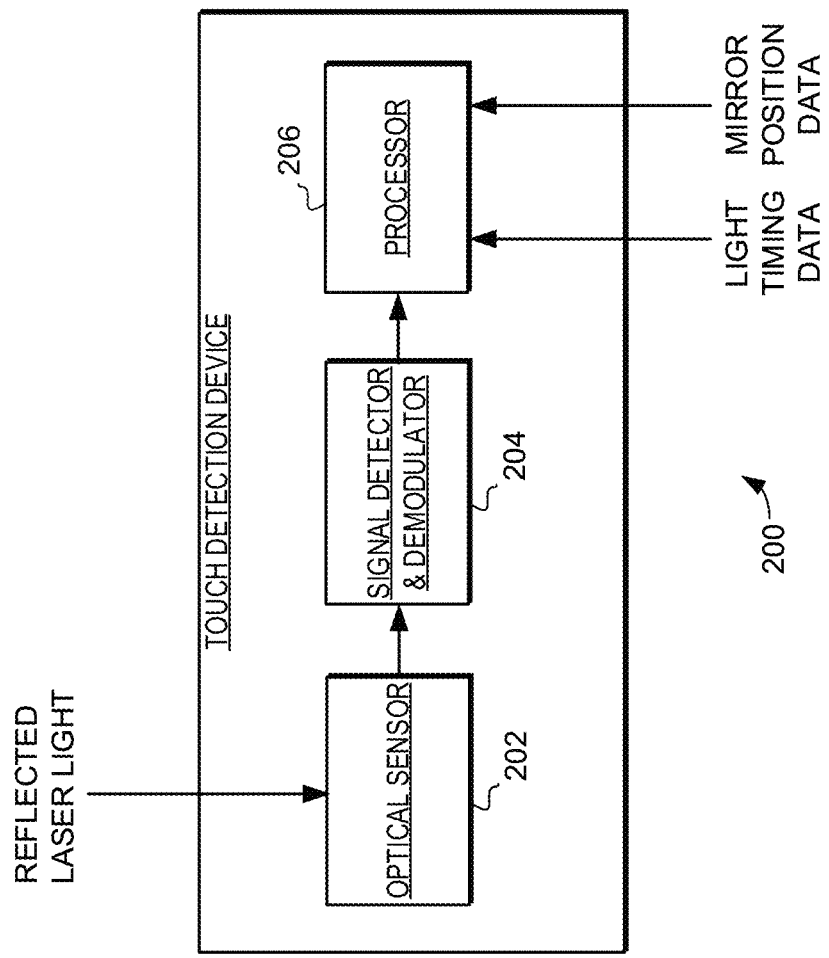
FIG. 2. shows a schematic view of a touch detection device in accordance with various embodiments of the present invention.

Turning now to FIG. 2, a more detailed embodiment of a touch detection device 200 is illustrated. In FIG. 2, the touch detection device 200 includes an optical sensor 202, a signal detector and demodulator 204, and a processor 206. In general, the optical sensor 202 receives the reflected pulses of light and generates an output signal that is proportional to the received light. Those output signals are amplified and passed to the signal detectors and demodulator 204. The signal detectors and demodulator 204 generates timing data from the amplified output signals, and that timing data is passed to the processor 206. This timing data can include a time signal proportional to the time of flight of each received pulse and an amplitude signal proportional to the output signal amplitude. The processor 206 also receives light timing data from the light source (e.g., laser light source 102). This light timing data describes the timing of the detection pulses projected on to the surface. Likewise, the processor 206 receives mirror position data from the drive circuit (e.g., drive circuit 106). The mirror position data describes the position of the mirror as it relates to each detection pulse. In some embodiments those signals can be filtered, synthesized or otherwise processed prior to sending to the processor 206, while in other embodiments those signals can be processed by the processor 206.

In one embodiment, the processor 206 is configured to generate 3-dimensional point clouds based on the time of flight and amplitude of the received pulses, the light timing data and the mirror position data. Specifically, the time of flight for each pulse to travel from the light source to the surface, and back to the optical sensor can be determined at least in part by light timing data and the amplitude signals from the signal detectors and demodulators 204. The location on the surface corresponding to each pulse can be determined at least in part from the mirror position data. Because the time of flight of each pulse is proportional to the distance to the surface at that point, the time of flight can be used to calculate the surface depth at that point of reflection. And when a composite of the determined surface depths from each point in the raster pattern scan is made, the resulting content can provide a 3-dimensional point cloud describing the surface depth of the scanned surface.

In some embodiments the processor 206 is also configured to analyze the 3-dimensional point cloud to locate objects proximate to the surface. As one example, the current 3-dimensional point clouds can be compared to 3-dimensional point clouds generated during previous scans. In such an embodiment previous scans taken when no objects were likely to be present can be used as baseline set of values. New 3-dimensional point clouds can then be compared to the baseline values to determine the changes in the point clouds, as those changes are likely to indicative of objects in the sensing region. As another example, 3-dimensional point clouds can be generated from multiple depth mapping scans and compared. In either case, such a comparison can be used to locate changes in the scanning region. In yet other implementations, shaper classifier methods or shape/image fit techniques can be employed.

In accordance with the embodiments described herein, the processor 206 is further configured to determine if any of the located objects are touching the surface analyzing the amplitude signals to locate halo regions proximate to the located objects. Again, the presence of such halo regions can confirm that a located object is touching the surface and not merely hovering over the surface. As described above, the signal detectors and demodulator 204 will generate timing data that includes a time signal proportional to the time of flight of each received pulse and an amplitude signal proportional to the output signal amplitude generated by the optical sensor 202. Because the amplitude signals are proportional to the output signal amplitudes, they will generally be at least partially proportional to the intensity of the received reflections from the corresponding point in the scanning region. Thus, areas of the touch surface and objects that reflect higher intensity amounts of laser light will generally have larger corresponding amplitude signals.

A variety of techniques can be used to generate amplitude signals that are proportional to the intensity of the received reflections. As one example, the output generated by the optical sensor 202 can be used directly or with filtering to provide the amplitude signals. For example, the optical sensor 202 can be configured to output a current or voltage signal that is at least partially proportional to the intensity of the received reflection, and that output current or voltage used to generate the amplitude signals.

As one specific example, the optical sensor 202 can be configured to output current that is proportional to the intensity of the received reflections, and that output current can be used to charge a sensing capacitor. A measurement of the charge on the sensing capacitor resulting from a received reflection can then be used to generate a corresponding amplitude signal.

As one more specific example, the charge on a sensing capacitor can be measured by discharging the sensing capacitor at a constant rate and measuring the time needed for the sensing capacitor to reach a threshold voltage measured. In this embodiment the time of discharge is proportional to the original charge on the sensing capacitor resulting from a received reflection and thus can be used to generate the amplitude signals that are proportional to the intensity of the received reflection. Thus, in this example the amplitude signals for each point in a scan are proportional to the intensity of the received reflections for that point.

The processor 206 can be implemented with any suitable type of processing system or device. For example, the processor 206 can be implemented with software implemented programs that are loaded into memory and executed on hardware, where the hardware utilizes integrated circuits designed to execute such programs. In other embodiments, the processor 206 can be implemented exclusively in hardware or in combinations of hardware and software. For example, the processor 206 can be implemented to include application-specific integrated circuits (ASICs) designed for this specific application, or general purpose central processing units (CPUs) that commonly provide processing functionality on computing devices. Furthermore, system on chip (SoC) processors can integrate a variety of system components into a single integrated device, and may include digital, analog, optical, and other functions on a single semiconductor substrate.

Figure 3A:
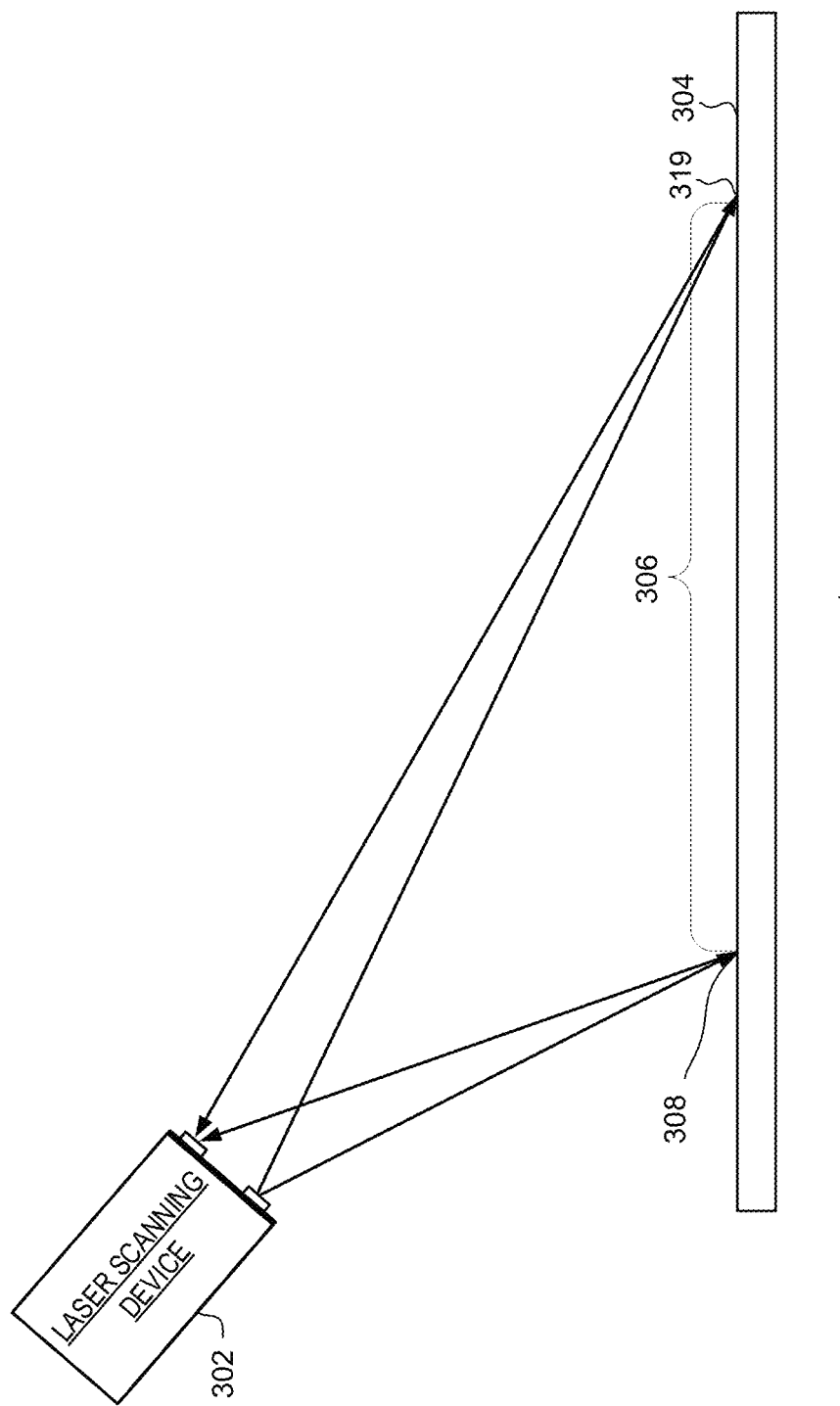

Turning now to FIG. 3A, a schematic diagram 300 illustrating a laser scanning device 302 is illustrated. The diagram 300 shows the laser scanning device 302 generating a laser that is reflected off a surface 304 and received back at the laser scanning device 302. In the example of FIG. 3A, the laser scanning device 302 can scan over a scanning region 306 that extends between a relatively near point 308 to a relatively far point 310. Of course, this illustrated example is just one potential configuration and other implementations are possible.

As described above, the laser scanning device 302 can be implemented to locate objects in the scanning region 306 and determine if any objects are touching the surface 304. To accomplish this, the laser scanning device 302 can be configured to receive reflects of the laser beam and generate 3-dimensional point clouds that provide a depth mapping of the surface 304 and any objects in the scanning region 306. For example, the 3-dimensional point clouds can be generated using time of flight data generated from the received reflections of the laser beam. Again, in such an embodiment, the 3-dimensional point clouds can be used to locate any objects that are on the surface 304 and in the scanning region 306.

Figure 3B:
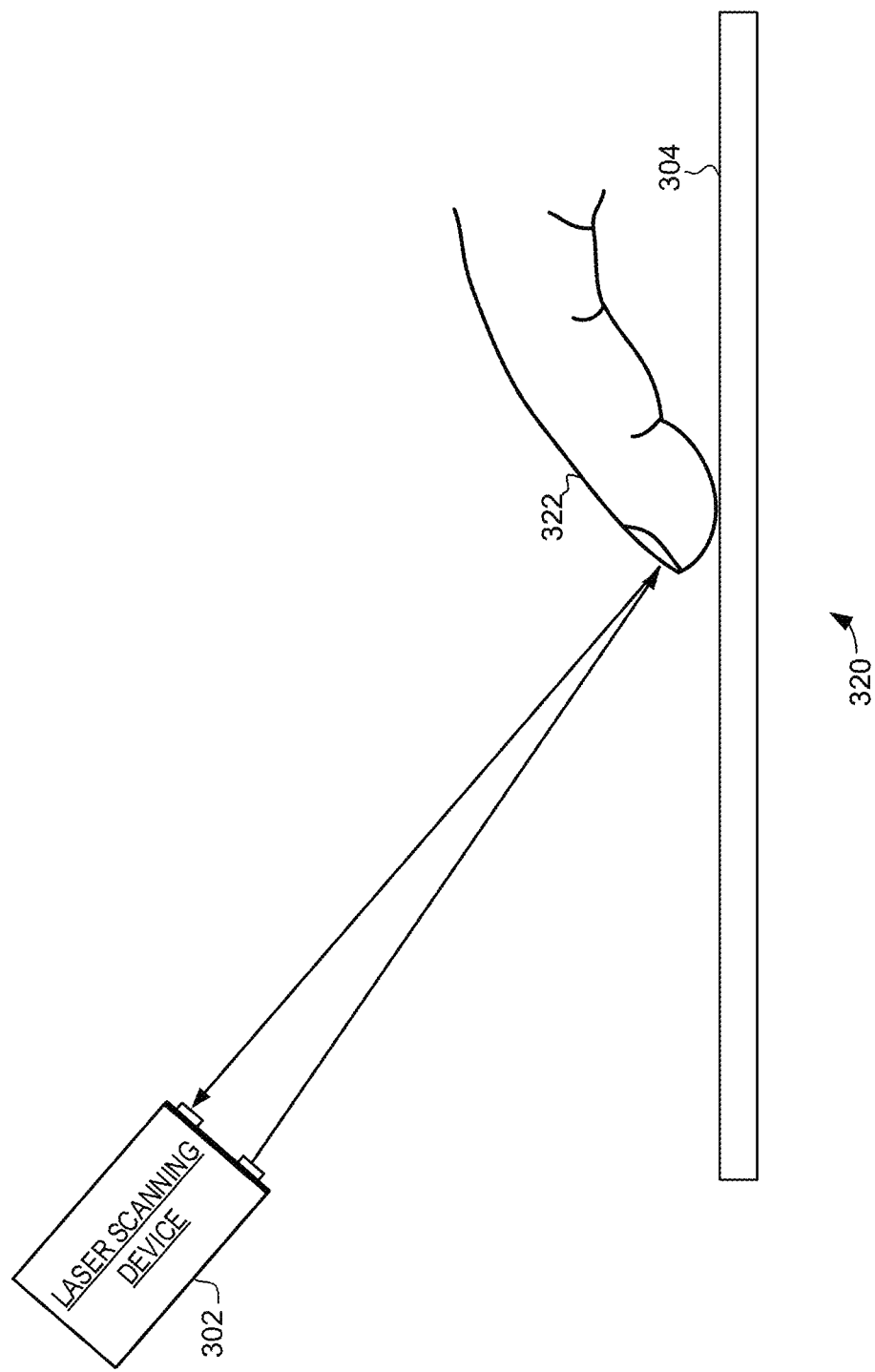

Turning now to FIG. 3B, a second schematic diagram 320 illustrating the laser scanning device 302 is illustrated. In the example of FIG. 3B, finger 322 is in the sensing region of the laser scanning device 302. Thus, in this example the laser scanning device 302 will project scanning lasers that reflect off the surface 304 and off the finger 322. These reflections will be received by the laser scanning device 302 and used to generate 3-dimensional point clouds. And again, in such an embodiment the 3-dimensional point clouds can be used to determine the location of the finger 332 and other objects in the sensing region.

However, as was described above it can be problematic to reliably determine if the finger 322 is a touching the surface 304 or if instead the fingers 322 are merely hovering over the surface using only the 3-dimensional point clouds. This is especially true for fingers and other objects that vary in size and depth, as in most cases the 3-dimensional point cloud will only provide a depth map the top of such fingers 322.

To overcome this, the embodiments described provide the laser scanning device 302 with the ability to determine if the finger 322 is touching the surface by determining if a halo region having corresponding locally high amplitude signals is proximate to the finger 322. The presence of such a halo region proximate to the finger 322 confirms that the finger 322 is touching the surface and not just hovering above the surface.

Turning now to FIG. 3C, a third schematic diagram 340 illustrating the laser scanning device 302 is illustrated. Specifically, FIG. 3C shows the mechanism by which halo regions are created when the finger 322 is touching the surface 304. In this example, finger 322 is again in the sensing region of the laser scanning device 302.

During operation of the laser scanning device 302, laser light from the laser scanning device 302 will thus be scanned across the surface 304 and the finger 322. When the finger 322 is touching the surface 304 and the laser scans the region proximate the tip of the touching finger 322, that laser light will reflect back to the laser scanning device 302 in at least two different paths. These two different reflection paths back to the laser scanning device 302 will increase the signal amplitudes associated with that region and will thus create the halo region that is detected to confirm the touch of the finger 322 on the surface 304.

Specifically, as shown in FIG. 3C a portion of the laser light will reflect directly back from the surface 304 to the sensor on the laser scanning device 302. Similarly, another portion of the laser light will reflect from the surface 304 and to the tip of the finger 322. Some portion of this laser light will then reflect off the fingertip and back to the sensor on the laser scanning device 302 as shown in FIG. 3C. These reflections back to the sensor along two different paths will combine and thus increase the intensity of light received at the laser scanning device 302. This will in turn increase the amplitude signals that correspond to this region of the surface, and this increase in amplitude signals creates a well-defined halo region that can be detected and used to confirm the touch of the finger 322 on the surface 304.

It should be noted that a hovering finger 322 would not create such a well-defined halo region. Specifically, while some portion of laser light will reflect off the finger tip of a hovering finger, the resulting region of greater intensity will have relatively small increase in amplitude signals. Furthermore, this region of relatively small increase in intensity will cover a relatively large area of the scanning region. Thus, a hovering finger 322 will create a relatively diffuse region of slightly greater intensity compared to a halo region resulting from finger touch. Additionally, the edges of a region of slightly greater intensity created by a hovering finger will commonly have less defined or blurry edges. For all these reasons, a well-defined halo region of increased amplitude signals that result from a touching finger can be distinguished from a larger region of relatively small increases in amplitude signals that can result from a closely hovering finger. Thus, the existence of such a halo region can be determined and used to confirm a touch of the finger on the surface.

Figure 4B:
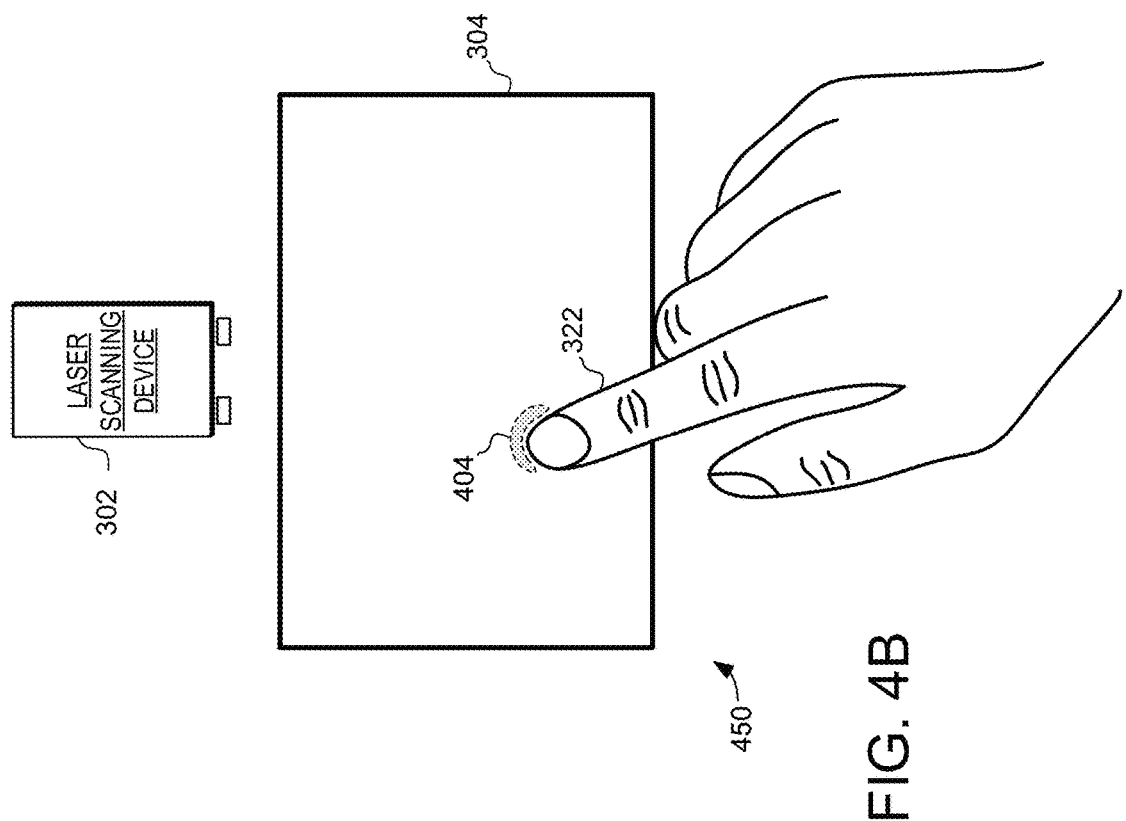

Turning now to FIGS. 4A and 4B, a fourth schematic diagram 400 and a fifth schematic diagram 450 showing top views of laser scanning device 302 are illustrated. These top views again show the finger 322 in the sensing region of the scanning laser device 302.

Specifically, the top view in FIG. 4A shows the finger 322 hovering over the surface 304 and the resulting region 402 of relatively small increase in amplitude signals. As described above, a hovering finger will result in a relatively diffuse increase in amplitude signals compared to the halo region resulting from finger touch. Thus, this region 402 will cover a larger area while having a relatively small increase in corresponding amplitude signals.

The top view in FIG. 4B shows an example halo region 404 created when the finger 322 touches the surface 304. Again, this halo region 404 is a portion of the sensing region that has corresponding locally high amplitude signals surrounded by relatively low amplitude signals that are proximate to the tip of the finger 322. Again, these locally high amplitude signals are created by reflections along multiple paths back to the scanning laser device 302. Specifically, the light from these multiple paths will combine at the sensor and thus increase the amount of light received at the laser scanning device 302 when scanning the surface 304 in the area of the halo region 404. This will in turn increase the amplitude signals that are generated in the scanning laser device 302 in response to those received reflections. And this increase in amplitude signals can be detected and used to confirm the touch of the finger 322 on the surface 304.

As can be seen in FIG. 4B, the shape and the size of the halo region 404 will typically conform to the shape and size of the portion of the object that created the halo region 404. In this case, the halo region 404 is closely proximate to and closely sized with the tip of the finger 322. As such, this well-defined halo region 404 of increased amplitude signals that result from a touching finger can be distinguished from a larger region 402 of relatively small increases in amplitude signals that can result from a hovering finger. For example, in some embodiments the location, size and/or shape of the halo region 404 can be calculated and that size and/or shape used to confirm the touch of the finger 322 to the surface 304.

For example, in a typical embodiment the scanning laser device 302 will confirm a touch of the finger 322 or other object on the surface 304 when the halo region 404 has a relatively large difference in amplitude signals compared to the amplitude signals of the surrounding area. For example, the scanning laser device 302 can determine the average and/or aggregate difference between amplitude signals inside the halo region 404 and immediately outside the halo region 404, and the scanning laser device 302 can confirm a touch only when this average or aggregate difference is greater than a threshold amount.

As another example, in the scanning laser device 302 can confirm a touch of the finger 322 or other object on the surface 304 when the determined position of the halo region 404 is within a specified threshold distance from the detected finger 322 or other object. Similarly, in other embodiments the scanning laser device 302 will only confirm a touch of the finger 322 on the surface 304 when the size of the halo region 404 is within a specified threshold range selected to be similar to expected objects, e.g., typical fingers. In each case such characteristics of any possible halo regions can be calculated and used to determine if a touch of the finger 322 to the surface 304 is confirmed.

In the embodiments described above a scanning laser projector is implemented to include a touch detection device. This touch detection device is configured to confirm that an object has touched the touch surface based on received reflections of the laser beam. Specifically, the touch detection device is configured to determine if an object is touching the surface by determining if a halo region having corresponding locally high amplitude signals is proximate to the object. The presence of such a halo region proximate to the object confirms that the object is touching the surface and not just hovering above the surface.

A variety of techniques can be used to determine if a halo region exists in the amplitude signals. For example, in one embodiment a set of amplitude signal values can be calculated and used as a baseline set of values. New amplitude signals can then calculated and compared to the baseline values to determine the changes in the amplitude signals. As another example, amplitude signals can be generated from multiple scans and compared. In either case, such a comparison can be used to locate halo regions proximate to located objects in the scanning region.

Turning now to FIG. 5A, a table 502 illustrates an exemplary set of baseline amplitude signals generated by a scanning laser projector. In this example each amplitude signal corresponds to one scanning point or pixel in the scanning pattern. Thus, each amplitude signal corresponds to intensity of the received reflections for one detection pulse generated by the laser light source. It should be noted that table 502 is very simplified example of the type of data that can be produced by a scanning laser projector. A typical scanning laser projector would have much higher resolution with many more scanning points and corresponding amplitude signals. For example, a typical scanning laser projector can scan provide scanning resolutions of 640×480, 848×480, 1280×720, or 1920×1080.

As can be seen in table 502, the baseline set of amplitude signals are relatively near zero over the entire sensing region. The variations in the amplitude signals can be caused by minor variations in ambient light, noise and other factors.

Turning now to FIG. 5B, a table 504 illustrates an exemplary set of amplitude signals taken with a finger touching the surface in the scanning region. As can be seen in table 504 the presence of the finger increases the amplitude signals over the majority of the sensing region. Furthermore, the presence of the finger creates a halo region 506. This halo region 506 is a region that has locally high amplitude signals and proximate to the finger. In this example the halo region 506 has relatively high amplitude signals compared to the area 508 surrounding the halo region 506. Stated another way, the halo region 506 is region of locally high amplitude signals surrounded by relatively low amplitude signals.

Figure 6:
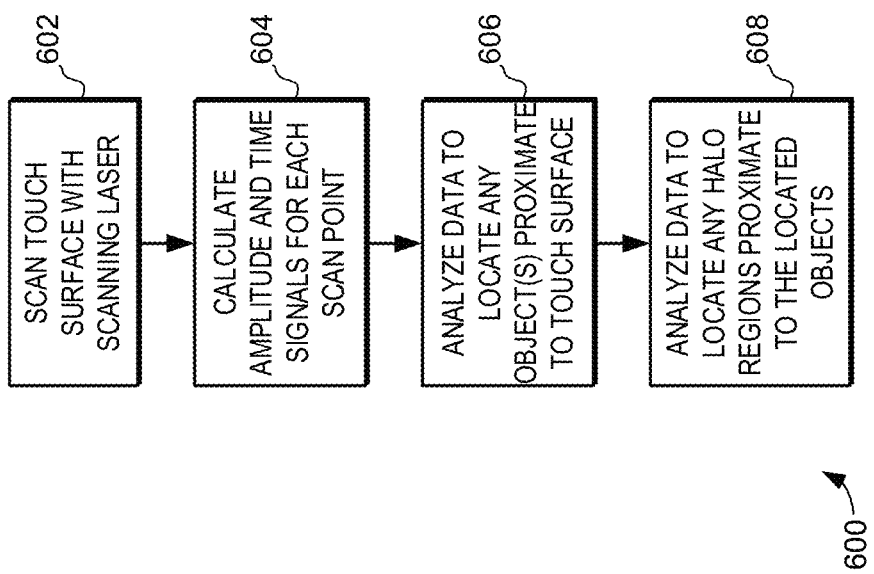
FIG. 6 is a flow diagram of a touch detection method in accordance with various embodiments of the present invention.

Turning now to FIG. 6, a flow diagram 600 for detecting a touch on a surface is illustrated. The first step 602 is to scan a touch surface with a scanning laser. As described above, one or more laser light sources generate a beam of laser light that is reflected by the scanning mirror(s) into a pattern of scan lines. As one example, the laser light source can comprise an infrared laser and one or more visible light lasers, and can be configured to generate detection pules with the infrared laser, where each detection pulse corresponds to one scan point in the sensing region. These detection pulses reflect off the touch surface and any objects inside the sensing region. The reflections of the detection pulses are received by one or more optical sensors on the scanning laser device.

The next step 604 is to calculate amplitude signals and time signals for each scan point. As one example, the optical sensor generates an output signal that is proportional to intensity of the received light for each received reflection of the detection pulses. This output signals can then be demodulated and processed to generate a time signal proportional to the time of flight of each received detection pulse and an amplitude signal proportional to the received signal amplitude. Thus, a time signal and an amplitude signal can be generated for each scan point in the sensing region The next step 606 is to analyze the data to locate any objects proximate to the touch surface in the scanning region. In one embodiment, this can be accomplished by generating 3-dimensional point clouds based on the amplitude and time signals for each scan point. Specifically, the time of flight for each detection pulse can be determined at least in part by time and amplitude signals. Because the time of flight of each pulse is proportional to the distance to the surface at that point, the time of flight can be used to calculate the surface depth at that point of reflection. And when a composite of the determined surface depths from each point in the raster pattern scan is made, the resulting content can provide a 3-dimensional point cloud describing the surface depth of the scanned surface.

These 3-dimensional point clouds can then be analyzed to locate objects proximate to the surface. As one example, 3-dimensional point clouds can be compared to previously calculated 3-dimensional point clouds. In such an example the previously calculated 3-dimensional point clouds are selected to correspond to a time when no objects were likely to be present and thus can be used as baseline set of values for locating objects.

The next step 608 is to analyze the data to locate any halo regions proximate to the located objects. As one example, the amplitude signals can be analyzed to locate halo regions proximate to the located objects. Specifically, the amplitude signals generated over the sensing region can be analyzed to determine if any halo regions having corresponding locally high amplitude signals are proximate to the located objects. The presence of such halo regions can confirm that a located object is touching the surface and not merely hovering over the surface.

In step 608 a variety of techniques can be used to determine if a halo region exists in the amplitude signals. For example, in one embodiment a set of amplitude signals can be generated and used as a baseline set of amplitude values. New amplitude signals can then generated during later scanning and compared to the baseline values to determine the changes in the amplitude signals. This comparison can generate a difference in amplitude signals, and that difference can then be compared one or more threshold values to determine if the amplitude signals are in a threshold range that corresponds to likely halo regions. In other examples the size and shape of the halo region can be compared to the object. For example, the size and shape of a possible halo region can be compared to the size and shape of a typical human finger. Again, this provides the ability to confirm the presence of the halo region in the amplitude values and can thus be used to confirm that the object has touched the touch surface. As another example, the amplitude signals over time can be analyzed to determine if the halo region appeared in time with the presence of the finger. The appearance of a halo region at the same time or shortly after the appearance of a finger in the sensing region can confirm that the halo region is indicative of the finger touching the surface.

The embodiments described herein can be implemented in a wide variety of different types of laser scanning devices. As described above, these in some embodiments this can include devices that combine depth sensing and object detection with image projection, generally referred to as scanning laser projectors. These scanning laser projectors can both project images that can include one or more virtual user interface elements (e.g., buttons, sliders, etc.) and can use the depth mapping, object detection, and touch detection to determine when a user is touching those virtual user interface elements.

Figure 7:
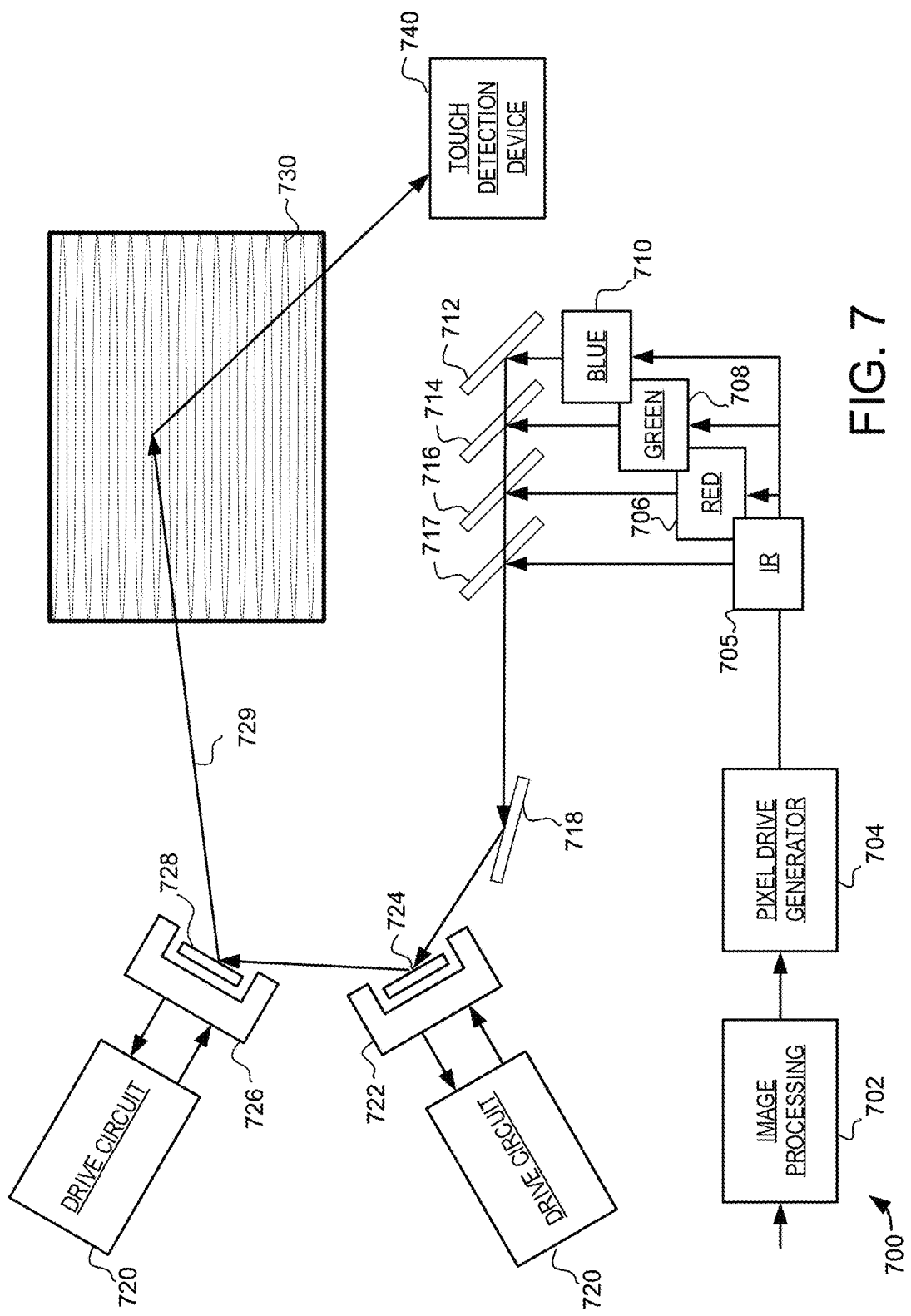
FIG. 7 shows a schematic view of a scanning laser projector in accordance with various embodiments of the present invention.

Turning now to FIG. 7, a schematic view of a scanning laser projector 700 is illustrated. The scanning laser projector 700 is a more detailed example of one type of laser scanning device that can be used in accordance with various embodiments of the present invention. Specifically, the scanning laser projector 700 can be implemented using the touch detection devices and methods described above.

Scanning laser projector 700 includes an image processing component 702, a pixel drive generator 704, an infrared laser module 705, a red laser module 706, a green laser module 708, and a blue laser module 710. In such an embodiment, the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first scanner assembly 722 with first scanning mirror 724, and second scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first scanning mirror 724 can be operated on a resonant vibrational mode of the scanning mirror 724 to create sinusoidal motion. Together, this generates both horizontal and vertical motion of the laser beam and results in the pattern 730 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first scanner assembly 722 and the second scanner assembly 726 both use electromagnetic actuation. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to scanner assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from scanner assemblies 722 and 726. The feedback signals can describe the driven deflection angles of the mirrors, and can be used by the drive circuits 720 to more accurately control the motion of the scanning mirrors 724 and 728.

For example, the drive circuits 720 can excite resonant motion of scanning mirrors 724 and/or 728 such that the peak amplitude of the feedback signal is constant. This provides for a stable maximum angular deflection on the fast-scan axis as shown in raster pattern 730. The excitation signal used to excite resonant motion of scanning mirrors 724 and 728 can include both amplitude and a phase. Drive circuits 720 can include feedback circuits that modify the excitation signal amplitude to keep the feedback signal peak amplitude substantially constant. Additionally, the drive circuits 720 can modify the excitation signal to control the horizontal phase alignment and vertical position of the raster pattern 730.

To facilitate this, drive circuits 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 7 illustrates an embodiment with red, green, blue, and infrared laser light sources, the various embodiments are not limited to these exemplary wavelengths of laser light.

In accordance with the embodiments described herein, the touch detection device 740 is provided to determine when one or more objects are touching a touch surface. To facilitate this the touch detection device 740 is configured to receive reflections of the laser beam and determine if an object is touching the surface by determining if a halo region having corresponding locally high amplitude signals is proximate to the object.

The touch detection device 740 can also receive light timing data from the pixel drive generator 704 and/or infrared laser module 705. The touch detection device can also receive mirror position data from the drive circuit 720. From those signals and data, the touch detection device 740 can also generates a 3-dimensional point cloud of the surface. In one embodiment, touch detection device 740 generates the 3-dimensional point cloud by calculating a time of flight for each pulse that is reflected back and received by the optical sensor. Specifically, the time of flight for each pulse to travel from the infrared laser module 705 to the surface, and back to the receiver channels can be determined at least in part by light timing data and the signals from the receiver channels. The location on the surface corresponding to each pulse can be determined at least in part from the mirror position data. Because the time of flight of each pulse is proportional to the distance to the surface at that point, the time of flight can be used to calculate the surface depth at that point of reflection. And when a composite of the determined surface depths from each point in the raster pattern scan is made, the resulting content can provide a 3-dimensional point cloud describing the surface depth of the scanned surface. For these 3-dimensional point clouds any objects in the sensing region can be located, and this location of objects used when determining if one or more halo regions are proximate to the locate objects.

In one embodiment, a laser scanning device is provided, comprising: at least one source of laser light configured to generate a laser beam, the laser beam including detection pulses; at least one scanning mirror configured to reflect the laser beam; a drive circuit configured to provide an excitation signal to excite motion of the at least one scanning mirror to reflect the laser beam in a pattern of scan lines over a surface; and a touch detection device, the touch detection device configured to receive reflections of the detection pulses and generate amplitude signals from the received reflections, the touch detection device configured to determine if an object is touching the surface by determining if a halo region having corresponding locally high amplitude signals is proximate to the object.

In another embodiment, a laser scanning device is provided, comprising: at least one source of laser light configured to generate a laser beam; at least one scanning mirror configured to reflect the laser beam; a drive circuit configured to provide an excitation signal to excite motion of the at least one scanning mirror to reflect the laser beam in a pattern of scan lines over a surface; a pixel drive generator, the pixel drive generator configured to control the at least one source of laser light to generate detection pulses in the pattern of scan lines; and a touch detection device, the touch detection device including: an optical sensor configured to receive reflections of the detection pulses and generate output signals proportional to the received reflections of the detection pulses, a signal detector and demodulator configured to generate a timing signal proportional to time of flight of received reflections of the detection pulses and an amplitude signal proportional to intensity of the received reflection; and a processor configured to generate a 3-dimensional point cloud based at least in part on the timing signal, the processor further configured to analyze the 3-dimensional point cloud to locate objects proximate to the surface, and wherein the processing device is further configured to determine if a located object is touching the surface determining if a halo region having corresponding locally high amplitude signals and having a width corresponding to a typical finger width is proximate to the object.

In another embodiment, a method of detecting a touch on surface is provided, comprising: generating a laser beam, the laser beam including detection pulses; reflecting the laser beam with at least one scanning mirror; exciting motion of the at least one scanning mirror to reflect the laser beam in a pattern of scan lines on the surface; receiving reflections of the detection pulses from the surface; locating objects proximate to the surface based at least in part the received reflections of the detection pulses; and determining if a located object is touching the surface by determining if a halo region having corresponding locally high amplitude signals is proximate to the located object.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A laser scanning device comprising:
   at least one source of laser light configured to generate a laser beam, the laser beam including detection pulses;
   at least one scanning mirror configured to reflect the laser beam;
   a drive circuit configured to provide an excitation signal to excite motion of the at least one scanning mirror to reflect the laser beam in a pattern of scan lines over a surface; and
   a touch detection device, the touch detection device configured to receive reflections of the detection pulses and generate amplitude signals from the received reflections, the touch detection device configured to determine if an object is touching the surface by determining if a halo region having corresponding locally high amplitude signals is proximate to the object.

2. The laser scanning device of claim 1, wherein the touch detection device is further configured to determine if an object is touching the surface by determining if the halo region has a width corresponding to a typical finger width.

3. The laser scanning device of claim 1, wherein the touch detection device is further configured to determine if an object is touching the surface by determining if the amplitude signals corresponding to the halo region are with a threshold range.

4. The laser scanning device of claim 1, wherein the touch detection device is further configured to determine if an object is touching the surface by determining if the amplitude signals corresponding to the halo region have at least a threshold difference to amplitude signals corresponding to regions proximate to the halo region.

5. The laser scanning device of claim 1, wherein the touch detection device is further configured to determine if an object is touching the surface by determining if the halo region has a shape conforming to a portion of the object.

6. The laser scanning device of claim 1, wherein the touch detection device is further configured to determine if an object is touching the surface by determining if the halo region appeared in time with the object.

7. The laser scanning device of claim 1, wherein the touch detection device is configured to further locate objects proximate to the surface based at least in part on time-of-flight data generated from the received reflections.

8. The laser scanning device of claim 1, wherein the touch detection device is configured to determine if a halo region having corresponding locally high amplitude signals is proximate to the object by generating a baseline set of amplitude values and comparing the amplitude signals to the baseline values.

9. The laser scanning device of claim 1, wherein the touch detection device includes an optical sensor configured to generate output signals proportional to the received reflections of the detection pulses, a signal detector and demodulator configured to generate a timing signal proportional to a time of flight of each received reflection of the detection pulses and an amplitude signal proportional to a received reflection intensity.

10. A laser scanning device comprising:
    at least one source of laser light configured to generate a laser beam;
    at least one scanning mirror configured to reflect the laser beam;
    a drive circuit configured to provide an excitation signal to excite motion of the at least one scanning mirror to reflect the laser beam in a pattern of scan lines over a surface;
    a pixel drive generator, the pixel drive generator configured to control the at least one source of laser light to generate detection pulses in the pattern of scan lines; and
    a touch detection device, the touch detection device including:
       an optical sensor configured to receive reflections of the detection pulses and generate output signals proportional to the received reflections of the detection pulses,
       a signal detector and demodulator configured to generate a timing signal proportional to time of flight of received reflections of the detection pulses and an amplitude signal proportional to intensity of the received reflection; and
       a processor configured to generate a 3-dimensional point cloud based at least in part on the timing signal, the processor further configured to analyze the 3-dimensional point cloud to locate objects proximate to the surface, and wherein the processing device is further configured to determine if a located object is touching the surface determining if a halo region having corresponding locally high amplitude signals and having a width corresponding to a typical finger width is proximate to the object.

11. The laser scanning device of claim 10, wherein the touch detection device is further configured to determine if an object is touching the surface by determining if the amplitude signals corresponding to the halo region are within a threshold range.

12. The laser scanning device of claim 10, wherein the touch detection device is further configured to determine if an object is touching the surface by determining if the amplitude signals corresponding to the halo region have at least a threshold difference to amplitude signals corresponding to regions surrounding to the halo region.

13. A method of detecting a touch on a surface, the method comprising:
  generating a laser beam, the laser beam including detection pulses;
  reflecting the laser beam with at least one scanning mirror;
  exciting motion of the at least one scanning mirror to reflect the laser beam in a pattern of scan lines on the surface;
  receiving reflections of the detection pulses from the surface;
  locating objects proximate to the surface based at least in part on the received reflections of the detection pulses;
  and determining if a located object is touching the surface by determining if a halo region having corresponding locally high amplitude signals is proximate to the located object.

14. The method of claim 13, wherein the step of determining if the located object is touching the surface by determining if the halo region having corresponding locally high amplitude signals is proximate to the located object comprises determining if the halo region has a width corresponding to a typical finger width.

15. The method of claim 13, wherein the step of determining if the located object is touching the surface by determining if the halo region having corresponding locally high amplitude signals is proximate to the located object comprises determining if the amplitude signals corresponding to the halo region are with a threshold range.

16. The method of claim 13, wherein the step of determining if the located object is touching the surface by determining if the halo region having corresponding locally high amplitude signals is proximate to the located object comprises determining if the amplitude signals corresponding to the halo region have at least a threshold difference to amplitude signals corresponding to regions proximate to the halo region.

17. The method of claim 13, wherein the step of determining if the located object is touching the surface by determining if the halo region having corresponding locally high amplitude signals is proximate to the located object comprises determining if the halo region has a shape conforming to a portion of the object.

18. The method of claim 13, wherein the step of determining if the located object is touching the surface by determining if the halo region having corresponding locally high amplitude signals is proximate to the located object comprises determining if the halo region appeared in time with the object.

19. The method of claim 13, wherein the step of locating objects proximate to the surface based at least in part on the received reflections of the detection pulses comprises locating objects proximate to the surface based at least in part on time-of-flight data generated from the received reflections.

20. The method of claim 13, wherein the step of determining if the located object is touching the surface by determining if the halo region corresponding to relatively high amplitude signals is proximate to the located object comprises generating a baseline set of amplitude values and comparing the amplitude signals to the baseline values.

\* \* \* \* \*